United States Patent [19]
Petrou

[11] Patent Number: 5,628,858
[45] Date of Patent: *May 13, 1997

[54] LABEL SYSTEM FOR REUSABLE CONTAINERS AND THE LIKE

[75] Inventor: Robert J. Petrou, Hudson, Ohio

[73] Assignee: MPT, Inc., Eastlake, Ohio

[ * ] Notice: The term of this patent shall not extend beyond the expiration date of Pat. No. 5,417,790.

[21] Appl. No.: 443,202

[22] Filed: May 18, 1995

Related U.S. Application Data

[63] Continuation of Ser. No. 292,882, Aug. 19, 1994, Pat. No. 5,417,790, which is a continuation-in-part of Ser. No. 955,119, Oct. 1, 1992, abandoned.

[51] Int. Cl.$^6$ .................................................. C09J 7/00
[52] U.S. Cl. ................ 156/249; 156/247; 156/248; 156/344; 40/594
[58] Field of Search .................. 156/247, 248, 156/249, 344; 428/40; 40/594

[56] References Cited

U.S. PATENT DOCUMENTS

| | | | |
|---|---|---|---|
| 3,854,229 | 12/1974 | Morgan | 40/2 |
| 3,974,311 | 8/1976 | Cherrin | 428/43 |
| 4,090,464 | 5/1978 | Bishopp et al. | 116/63 R |
| 4,104,816 | 8/1978 | Pingeton | 40/2 R |
| 4,253,899 | 3/1981 | Takemoto et al. | 156/277 |
| 4,359,358 | 11/1982 | Hattemer | 156/248 |
| 4,363,685 | 12/1982 | White | 156/212 |
| 4,398,985 | 8/1983 | Eagon | 156/233 |
| 4,479,838 | 10/1984 | Dunsirn et al. | 156/247 |
| 4,521,267 | 6/1985 | Jacobson | 156/249 |
| 4,534,582 | 8/1985 | Howard | 283/81 |
| 4,642,256 | 2/1987 | Sato | 428/42 |
| 4,767,654 | 8/1988 | Riggsbee | 428/40 |
| 4,863,772 | 9/1989 | Cross | 428/40 |
| 4,872,707 | 10/1989 | Do Bruix | 283/102 |
| 4,876,131 | 10/1989 | Ashby et al. | 428/42 |
| 4,928,874 | 5/1990 | Henry et al. | 229/74 |
| 4,932,684 | 6/1990 | Vermeulen | 283/81 |
| 4,933,124 | 6/1990 | Duncan | 264/22 |
| 4,938,414 | 7/1990 | Lippert | 229/92.8 |
| 5,019,436 | 5/1991 | Schramer et al. | 428/40 |
| 5,056,827 | 10/1991 | Sasso | 283/105 |
| 5,129,976 | 7/1992 | Horikiri | 156/213 |
| 5,248,536 | 9/1993 | Du Katz | 428/40 |
| 5,383,568 | 1/1995 | Tusick et al. | 220/606 |
| 5,417,790 | 5/1995 | Petrou | 156/249 |

FOREIGN PATENT DOCUMENTS 1090590  11/1967  United Kingdom.

Primary Examiner—Jill Warden
Assistant Examiner—Sharidan Carrillo
Attorney, Agent, or Firm—Watts, Hoffmann, Fisher & Heinke Co., L.P.A.

[57] ABSTRACT

A method of labeling reusable containers is disclosed. A placard having a release coating on one side is adhesively secured to the container. The placard is transparent with instructional printing applied to one surface. Pressure-sensitive labels are placed on the exposed surface of the placard. The labels contain indicia relating to the status of the container. When the status of the container changes, the label is removed and a new label is substituted on the placard.

5 Claims, 1 Drawing Sheet

100

LABEL SYSTEM FOR REUSABLE CONTAINERS AND THE LIKE

This is a continuation of application Ser. No. 08/292,882, filed on Aug. 19, 1994, now U.S. Pat. No. 5,417,790, issued May 23, 1995, which was a continuation-in-part of then application Ser. No. 07/955,119, filed on Oct. 1, 1992, now abandoned.

BACKGROUND OF THE INVENTION

1. Field of the Invention

The present invention relates to a method of labeling reusable containers, and more particularly, a method which provides a reusable surface for pressure-sensitive adhesive labels.

2. Description of Related Art

Reusable containers often require a labeling system to identify the contents and status of each container. The label provides information such as the origin and destination of the contents, batch number, part number, serial number, quantity, and description.

In one proposed labeling system, a transparent envelope is secured to the container. A label is placed inside the envelope where it can be viewed. When the status of the container changes such as when its content is changed, a new label is substituted in the envelope. Often times, bar codes are printed on the labels. A transparent envelope will sometimes interfere with proper scanning of the bar code. This is particularly true where, after time, the transparent envelope becomes stained or dusty. Also, the transparent envelopes are sometimes bulky and subject to tearing and catching on objects.

SUMMARY OF THE INVENTION

An object of the invention is to provide a method of labeling using pressure-sensitive adhesive-backed labels and a reusable placard for supporting said labels.

Another object is to provide a method of labeling using an adhesive-backed placard having a disposable liner covering the adhesive.

In a preferred embodiment, the invention comprises provision of a placard having an adhesive coated inner face and a release coated outer face. In use the adhesive coated face of the placard is applied to a surface with the release coated surface outermost. The placard is transparent and includes printing on the inner face which is visible and readable after the placard is applied to a surface to provide instructional information such as "place label here". A label is applied to the placard outer face such that a pressure sensitive adhesive backing of the label is releasably attached to the release coated surface even if the label has a so called permanent adhesive backing. When desired the label is easily removed when desired and replaced with another.

In the preferred embodiment the placard is provided with a disposable liner having a release coating on one face for covering the placard's adhesive coating. The liner is removed prior to applying the placard.

Other object and advantages and a fuller understanding of the invention will be had from the following detailed description of a preferred embodiment and the accompanying drawings.

BRIEF DESCRIPTION OF THE DRAWINGS

A preferred embodiment of the invention is shown in the accompanying drawings in which.

DESCRIPTION OF THE PREFERRED EMBODIMENT

Figure 1:
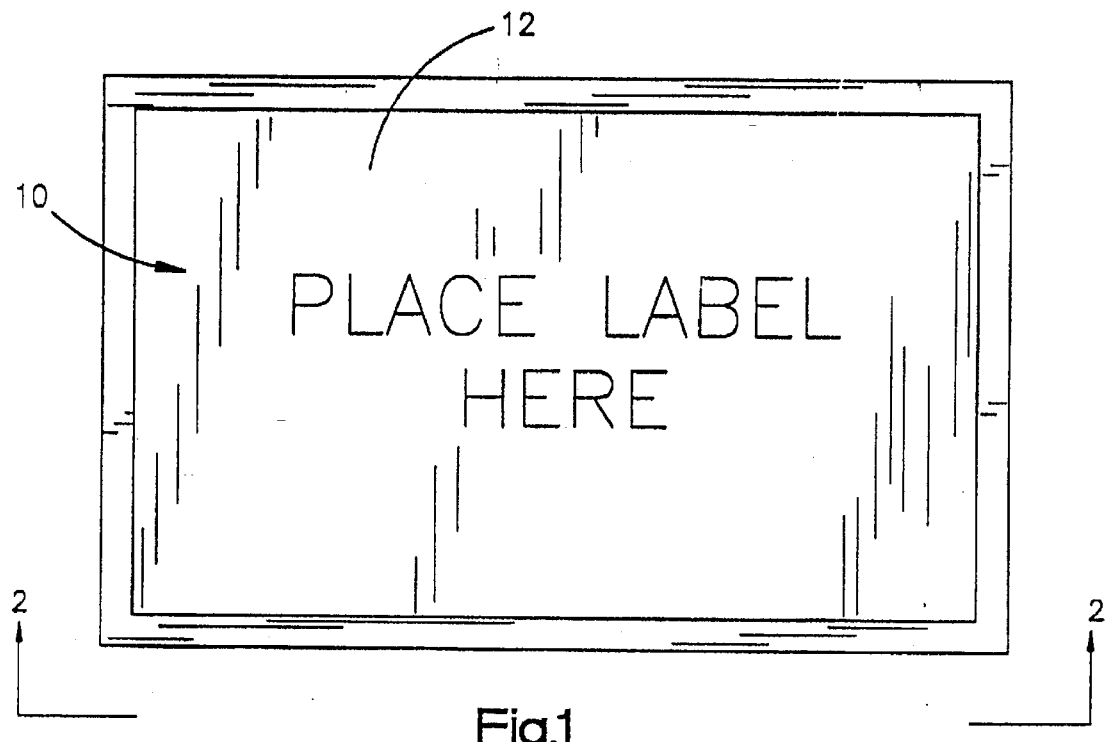
FIG. 1 is a top plan view of a placard constructed in accordance with the present invention.
Figure 2:
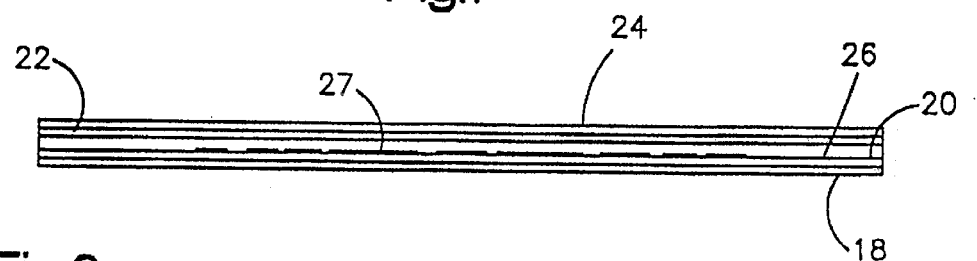
FIG. 2 is a side elevation view seen approximately from the plane indicated by lines 2—2 in FIG. 1.
Figure 3:
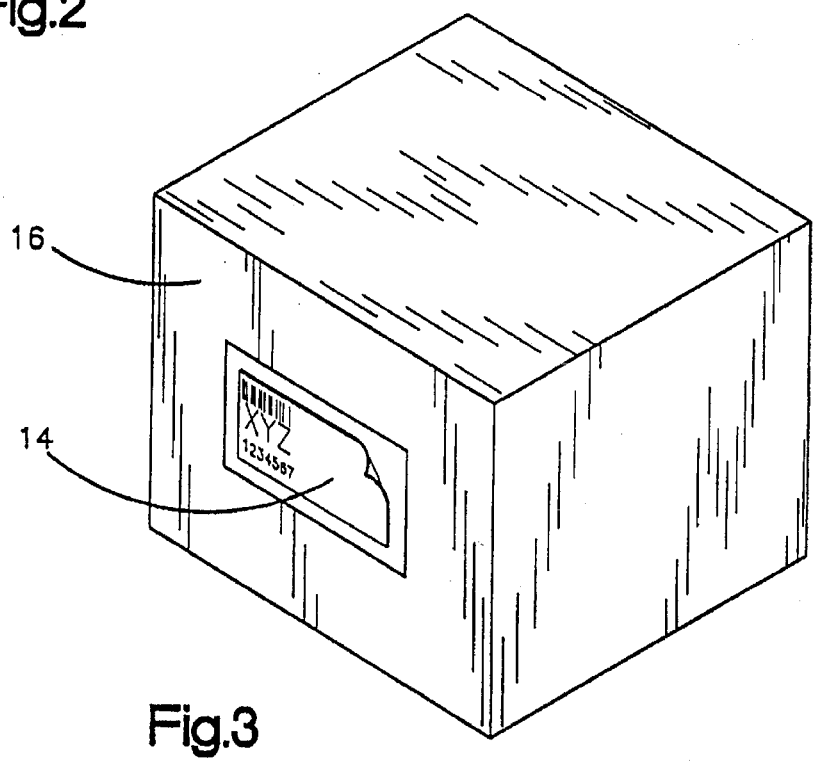
FIG. 3 is a perspective view of a reusable container labeled in accordance with the present invention.

Referring to FIGS. 1, 2 and 3, a multi-layer lamination 10 is shown. The lamination 10 includes a placard 12 for supporting replaceable adhesive-backed pressure-sensitive labels 14 on reusable containers 16 in the method of the present invention.

Referring to FIG. 2, the lamination 10 includes a disposable liner layer 18 which is preferably paper. The liner is provided with a silicone release layer 20.

The placard 12 includes a layer of transparent polypropylene film 22. The film 22 is provided on one face with a silicone release coating 24 and on the opposite face with a coating of adhesive 26. The opposite face bears printing 27 which is readily observed and read when the placard is in use to provide instructional information such as "place label here". The thickness of the printing 27 is exaggerated in FIG. 2 for clarity of illustration. The adhesive coating 26 is in contact with the release layer 20 prior to use. The liner 18 is easily removed, leaving the adhesive 26 exposed.

The lamination 10 is preferably assembled from commercially available products. For example, transparent polypropylene film 22, having a silicone release coating 24 on one face is commercially available from the Mobil Chemical Corporation. A paper liner 18, having a release coating 20 and a layer of white modified acrylic adhesive 26 laminated to one side, is commercially available from the 3M Corporation. The non-release coated side of the film 22 is laminated to the adhesive-coated surface of the 3M lamination 18, 20, 26 to produce the multi-layer lamination 10. Then, the lamination 10 is die-cut to remove a marginal portion of the film 22 and the adhesive 26. Thus, as seen in FIG. 1, the liner 18 is larger than the placard 12 to facilitate its removal. The white adhesive 26 is visible through the transparent film 22 to produce a highly visible placard 12 and a light background for the printing 27.

The preferred method is one for labeling reusable containers 28. First, the release-coated liner 18 is removed from the lamination 10. The placard 12 is applied to a container 28 such that the adhesive 26 secures the placard 12 firmly to the container 28 with the release coating 24 outermost and the printing 27 clearly visible. Then label 14, having an exposed adhesive layer, is applied to the placard 12 such that the label's adhesive contacts the release coating 24. The label carries printed indicia relating to the container and/or its contents. When desired, such as when the container is refilled, the label is removed and a new label 14 carrying new information is applied to the placard 12.

The placard allows pressure-sensitive labels to be easily removed and replaced as many times as necessary. The labels can be removed without ripping or tearing. The labels are not covered by a plastic envelope which results in better bar code scanning. In addition, the container stays free of label and adhesive build-up. Moreover, because of the release coating 24 any commercially available label can be used including those with inexpensive permanent pressure sensitive adhesive coatings rather than more expensive removable coatings.

While a preferred embodiment of this invention has been described in detail, it will be apparent that certain modifications or alterations can be made without departing from the spirit and scope of the invention as set forth in the appended claims.

I claim:

1. A process for providing identifying information as to the contents of an object on such an object, the process comprising:
    a) substantially permanently affixing a placard to one such object with a release coated surface of the placard oriented outwardly;
    b) providing a first label bearing information related to a first set of object contents;
    c) applying the first label to the placard by securing a pressure sensitive adhesive coating of the first label to the placard release coating;
    d) at a selected one of a time prior to and a time subsequent to the first label applying step positioning a first contents set in the object;
    e) removing the first contents set from the object and replacing it with a second contents set; and,
    f) at a selected one of a time prior to and subsequent to the first set removal step removing the first label from the placard while leaving the placard affixed to the object and applying to the release coated surface of the placard a pressure sensitive surface of a second label bearing information related to contents of the second set.

2. The process of claim 1 wherein the step of removing the first label includes removing the pressure sensitive adhesive of the first label from the release coating.

3. The method according to claim 1, wherein said placard is provided with a disposable liner having a release coating for covering the adhesive coated surface of said placard prior to attachment of said placard to the object.

4. A method of labeling and relabeling an object with replaceable pressure-sensitive adhesive-backed labels comprising:
    a) providing a plurality of pressure sensitive adhesive coated labels having indicia printed thereon;
    b) providing a placard having an adhesive coated surface and a release coated surface;
    c) substantially permanently affixing the placard to the object by applying the adhesive coated surface of said placard to a surface of the object with the release coated surface oriented outward;
    d) applying a first label to the placard by securing the pressure sensitive adhesive coating of the first label to the placard release coated surface;
    e) at a selected one of a time prior to and subsequent to the first label applying step, positioning a first contents set in the object;
    f) removing the first contents set from the object and replacing it with a second contents set; and
    g) at a selected one of a time prior to and subsequent to the first set removal step, removing the first label by separating the pressure sensitive adhesive coating of the first label from the release coated surface of the placard while leaving the placard fully attached to the object and applying to the release coated surface of the placard a pressure sensitive adhesive coating of a second label having indicia related to the contents of the second set.

5. The method according to claim 4, wherein said placard is provided with a disposable liner having a release coating for covering the adhesive coated surface of said placard prior to attachment of said placard to the object.

* * * * *